United States Patent
Macaulay et al.

(10) Patent No.: US 6,188,886 B1
(45) Date of Patent: *Feb. 13, 2001

(54) SERVER BASED VOICE CALL OFFER WHILE TELEPHONE IN DATA SESSION

(75) Inventors: Robert Paul Macaulay, Gloucester; Brian Egan, Stittsville, both of (CA)

(73) Assignee: Nortel Networks Limited, Montreal (CA)

( * ) Notice: Under 35 U.S.C. 154(b), the term of this patent shall be extended for 0 days.

This patent is subject to a terminal disclaimer.

(21) Appl. No.: 09/090,189

(22) Filed: Jun. 4, 1998

(51) Int. Cl.[7] .................................................. H04M 1/50
(52) U.S. Cl. ........................ 455/415; 455/414; 455/550; 379/142; 379/245
(58) Field of Search .................................. 455/414, 415, 455/413, 412, 419, 422, 550, 566, 575, 426, 564, 558, 567, 460, 31.3, 556; 379/88.19, 88.2, 88.21, 354, 355, 112, 115, 127, 142, 245, 247, 229

(56) References Cited

U.S. PATENT DOCUMENTS

| | | | |
|---|---|---|---|
| 5,557,605 | * 9/1996 | Grube et al. | 370/29 |
| 5,581,599 | 12/1996 | Tsuji et al. | 379/63 |
| 5,875,403 | * 2/1999 | Christal | 455/550 |
| 5,883,943 | * 3/1999 | Siddiqui | 379/142 |
| 5,999,599 | * 12/1999 | Shaffer et al. | 379/93.23 |

* cited by examiner

Primary Examiner—Daniel S. Hunter
Assistant Examiner—Pablo Tran

(57) ABSTRACT

During the occurrence of an incoming voice call to a portable telephone handset within an in building telephone system, a method is disclosed for offering the voice call while the called handset is in a data session with an application. In such a case, the data session is interrupted and the handset display and softkey information is saved to memory. The name or number of the calling party is then written to the display of the called handset while the incoming call is offered to the user. A call acceptance signal from the called handset results in the establishing of a voice communication connection between the handset and the calling party. Independent of whether the incoming call is accepted or rejected by the user of the called handset, the saved display and softkey information is restored to the called handset and the data session is resumed between the portable handset and the application once the selection is made.

34 Claims, 5 Drawing Sheets

SERVER BASED VOICE CALL OFFER WHILE TELEPHONE IN DATA SESSION

FIELD OF THE INVENTION

This invention relates to a system and method for a server based telephone system wherein interactive handsets can operate within a data communication mode and a voice communication mode concurrently.

BACKGROUND OF THE INVENTION

Wireless in building telephones deploying a pico-cellular architecture allow employees to work away from their desks without the worry associated with missing incoming callers. A communication system such as this consisting of a central controller, base stations connected to the controller, and wireless handsets carried by the employees have allowed increased freedom and accessibility in the work place.

The central controller manages all incoming calls for the individual wireless handsets using an in building telecommunication network. The network is divided into cells which service the handsets in a defined area. Each cell contains a base station which exchanges voice and data information with the handsets located within the cell's coverage area. When a call arrives for a particular handset, the controller determines the cell location of the requested handset and alerts the user with a notification alarm on the handset.

As aforementioned, one key advantage of this system is the ability of the user to work away from their work area while not missing incoming calls. A problem results from the fact that this inevitably increases the time the employee is away from his/her Personal Computer (PC) and its associated applications and databases. This reduction in access to valuable resources can harm productivity and limits the true freedom gained by the use of the portable telephone system.

The ability to communicate caller identification data from the central controller to the handset is well known. Generally, this information which includes the name and/or number of the calling party is transferred to the liquid crystal display (LCD) of the handset when the handset is alerted of an incoming call. Such an apparatus is typified in U.S. Pat. No. 5,581,599 Tsuji et al, issued Dec. 3, 1996, the disclosure of which is incorporated herein by reference. This innovation allows limited information about the calling party to become available to the user of the portable telephone. This information, although useful, does not allow a user to gain access to applications or databases that may be located on a PC. If a user required additional information about a calling party before accepting the call, it would necessitate access to a PC and the specific databases needed.

There are presently available digital telecommunication systems that allow data sessions between the portable handset and the central controller. These data sessions may be initiated by the user or by applications running on a personal computer (PC) connected to the controller. Samples of these systems include the Companion 200 and Meridian Companion Mobility Option (MCMO) produced by Northern Telecom Limited and the Pocket Communication Systems (PCS) PCS50E, PCS150E, and PCS2000E produced by SpectraLink Corporation. These data sessions allow the user to access applications located on a server connected to the central controller remotely through a handset. While the user is away from a PC, this system allows for the activating and running of computer programs that may be required without prescribing that the user be situated at the same location as the PC. This increases the accessibility of information to the user while away from a PC.

An inherent problem that occurs through the use of the portable telephone as both a means for voice communication and a means for data communication is the inability of the central controller to access the user for a voice call while the user is engaged in a data session on the handset with the server. This reduces the availability of the user to outside callers and limits the advantages gained by the portable telephone system.

SUMMARY OF THE INVENTION

It is an object of the present invention to overcome the disadvantage of the prior art and, in particular, to provide a technique whereby a user engaged in a data session may be offered a voice call which he/she may accept or reject.

According to a first aspect, the present invention provides a telephone communications network capable of operation in both data communication and voice communication mode, the network comprising: at least one display based telephone handset; a central switching controller coupled to the telephone handset and connectable to an external switched telephone network for selective switching of the telephone handset to the external switched network; and a central computing device connected to the central switching controller and controlling operation of the central switching controller by means of control software running on the central computing device and providing selective access by the telephone handset through the central switching controller to application software running on the central computing device, wherein the control software operates, while the telephone handset is in a data communication mode with the application software and an incoming voice call for the telephone handset is received at the central switching controller, to save in memory information about the telephone handset, to offer the incoming voice call to a display on the telephone handset, to connect the voice call to the telephone handset in the event that an acceptance signal is sent from the telephone handset or to reject the voice call to the telephone handset in the event that a rejection signal is sent from the telephone handset, and to restore the information about the telephone handset to the telephone handset and reconnect the telephone handset to the data communication mode with the application software after reception of the acceptance signal or the rejection signal.

According to a second aspect, the present invention provides a method of offering an incoming voice call to a particular display based telephone handset in a telephone communications network while the particular handset is in a data communication mode with an application software, the telephone communications network capable of operation in both data communication and voice communication mode and comprising at least one display based telephone handset; a central switching controller coupled to the telephone handset and connectable to an external switched telephone network for selective switching of the telephone handset to the external switched network; and a central computing device connected to the central switching controller and controlling operation of the central switching controller by means of control software running on the central computing device and providing selective access by the telephone handset through the central switching controller to an application software running on the central computing device, the method comprising:

A) on receipt of the incoming voice call, saving in memory information about that particular handset;

B) offering the incoming voice call to a display on that particular handset;

C) connecting the voice call to that particular handset in the event that an acceptance signal is sent from the particular handset or rejecting the voice call in the event that a rejection signal is sent from the particular handset;

D) restoring the information about that particular handset to the particular handset after reception of the acceptance signal or the rejection signal; and E) reconnecting the particular handset to the data communication mode with the application software after receipt of the acceptance signal or the rejection signal.

According to a third aspect, the invention provides a computer readable storage medium containing control software that when running on a central computing device connected to a central switching controller which is further coupled to at least one display based telephone handset capable of operation in both data communication and voice communication mode, controls the operation of the central switching controller through a plurality of control steps, wherein the central switching controller is connectable to an external switched telephone network for selective switching of the telephone handset to the external switched network; wherein the central computing device provides selective access by the telephone handset through the central switching controller to application software running on the central computing device; and wherein the plurality of control steps performed while the telephone handset is in a data communication mode with the application software and an incoming voice call for the telephone handset is received at the central switching controller comprise:

A) saving in memory information about the telephone handset;

B) offering the incoming voice call to a display on the telephone handset;

C) connecting the voice call to the telephone handset in the event that an acceptance signal is sent from the telephone handset and rejecting the voice call in the event that a rejection signal is sent from the telephone handset;

D) restoring the information about the telephone handset to the telephone handset after receipt of the acceptance signal or the rejection signal; and E) reconnecting the telephone handset to the data communication mode with the application software after receipt of the acceptance signal or the rejection signal.

BRIEF DESCRIPTION OF THE DRAWINGS

The preferred embodiment of the present invention will now be described with reference to the following figures, in which.

DETAILED DESCRIPTION OF THE PREFERRED EMBODIMENT

The preferred embodiment of the present invention requires the use of the Companion Applications Toolkit (CAT) Application Programming Interface (API) produced by Northern Telecom Limited of Montreal, Canada. This CAT API corresponds to Northern Telecom part number A0674796 and is publicly offered for sale by Northern Telecom. The software manual for this API is the CAT Version 1.1 help file using Microsoft Windows Help Application 4.00.950 and is incorporated herein by reference.

Figure 1:
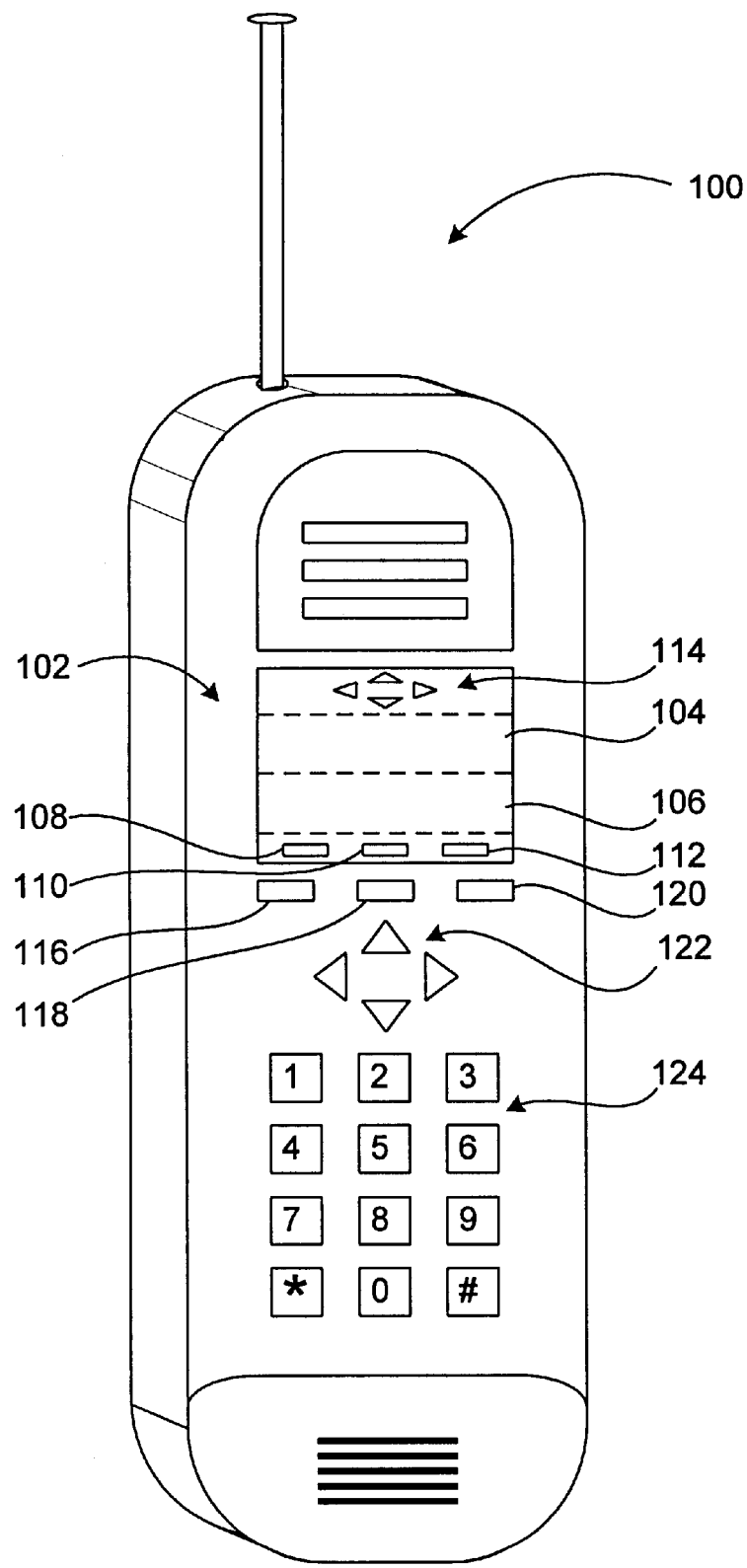
FIG. 1 is an illustration of a portable telephone handset in accordance with the preferred embodiment of the present invention.

FIG. 1 is an illustration of a portable telephone handset 100 in accordance with the present invention which, as will be described herein below is software configurable to provide enhanced telephone services in a voice and data communications network. The features of the handset 100 include a liquid crystal display (LCD) 102 with a first display line 104, a second display line 106, softkey icons 108,110,112, and navigational key (navkey) icons 114, softkey buttons 116,118,120, navkey buttons 122, and a dialpad 124. Software created using the CAT API controls the writing to the LCD 102 and the turning on or off of the softkey icons 108,110,112 and the navkey icons 114.

The process of turning on or off the softkey icons 108, 110,112 and navkey icons 114 includes activation and deactivation of the corresponding softkey buttons 116,118,120 and navkey buttons 122. The softkey icons 108,110,112 include a first softkey icon (left) 108, a second softkey icon (middle) 110, and a third softkey icon (right) 112 that correspond respectively to a first softkey button (left) 116, a second softkey button (middle) 118, and a third softkey button (right) 120 located below the softkey icons 108,110, 112 on the portable handset 100. Typically the second display line 106 of the LCD 102 is used to label the softkey icons 108,110,112 that are on by writing the appropriate labels directly above the particular softkey icons 108,110, 112 that are on.

Figure 2:
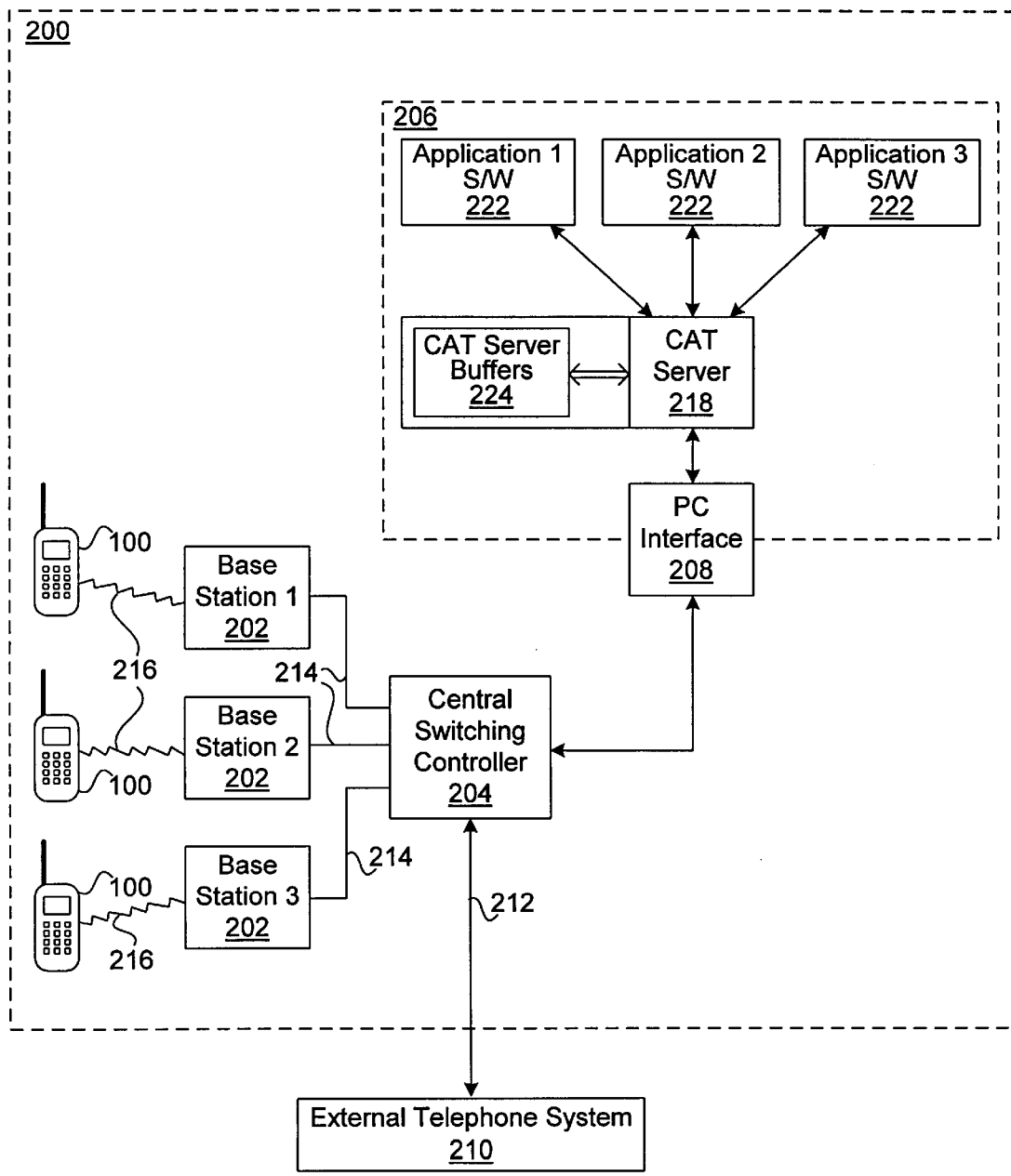
FIG. 2 is a block diagram of an in building portable telephone system in accordance with the preferred embodiment of the present invention.

FIG. 2 is a block diagram of an in building portable telephone system 200 in accordance with the preferred embodiment of the present invention, consisting of a plurality of portable telephone handsets 100, a plurality of base stations 202, a central switching controller 204 and a personal computer (PC) 206 connected to the controller 204 through a PC interface device 208. The central switching controller 204, the plurality of base stations 202, and the plurality of portable handsets 100 combined comprise the Companion 200 with Northern Telecom part number A0725269 in one embodiment and the Meridian Companion Mobility Option (MCMO) with Northern Telecom part number A0725270 in another embodiment. Both systems are produced by Northern Telecom Limited of Montreal, Canada.

The controller 204 connects the in building telephone system 200 to an external telephone system 210 through analog telephone lines 212. In the embodiment described above with the Companion 200, the external telephone system 210 consists of a Public Branch Exchange (PBX) which is further connected to a public switched telephone network and/or connected to PBXs of other telephone systems. In the embodiment described above with the MCMO, the central switching controller 204 is included within the PBX and the external telephone system 210 connected to the central switching controller 204 consists of a public switched telephone network and/or PBXs for other telephone systems.

The controller is connected to the portable handsets 100 through Time Compressed Multiplexing (TCM) telephone lines 214 between the controller 204 and the base stations 202, and radio channels 216 between the base stations 202 and the portable handsets 100.

The PC interface device 208 is used to translate data information and requests in the TCM form to the RS232 form that the PC 206 can process and translate data information and requests in the RS232 form to the TCM form that the central switching controller 204 can process. In the preferred embodiment, the PC interface device 208 is a Computer Telephony Adaptor (CTA) which consists of either a serial box CTA100 external to the PC 206 with Northern Telecom part number A0646509 or a PC interface card CTA150 internal to the PC 206 with Northern Telecom part number A0363108.

A Companion Applications Toolkit (CAT) server software 218 located within the PC 206 communicates with and has the capability to control the central switching controller 204 and the portable handsets 100 through the PC interface device 208 and regulates the operation of a plurality of software applications 222 programmed with the CAT API. An example of a possible software application 222 generated with the CAT API is a personal directory look up application selectively initiated by the user of one of the portable handsets 100 that allows the user to search a personal directory database located within the PC 206 for information on specific individuals. An additional example is a nurse call system application which initiates a data session with one or more of the portable handsets 100 carried by the nurses within a hospital ward in the event of an emergency request by a patient and provides additional information about the particular patient such as his/her room number to the handsets 100 in such an occurrence. A further example of such an application 222 is a stock inventory control application selectively initiated by the user of one of the portable handsets 100 that allows the user to access inventory databases located in the stock rooms or warehouses to determine if a product is in stock.

The CAT server software 218 is 16 bit software which operates under Microsoft WINDOWS versions 3.1, 3.11, and Win95. This server software 218 is capable of being upgraded to 32 bit software which can be operated under Microsoft WINDOWS versions Win95, Win98, and WinNT. There are four CAT server buffers 224 within the CAT server software 218 which store the string displayed on the first display line 104 of the LCD 102, the string displayed on the second display line 106 of the LCD 102, the status of the softkey icons 108,110,112 and the status of the navkey icons 114 associated with every portable handset 100 within the in building telephone system 200. This portable handset information is selectively updated in the CAT server buffers 224 and restored to the particular portable handsets 100 by the CAT server software 218 and its accompanying applications 222.

Figure 3:
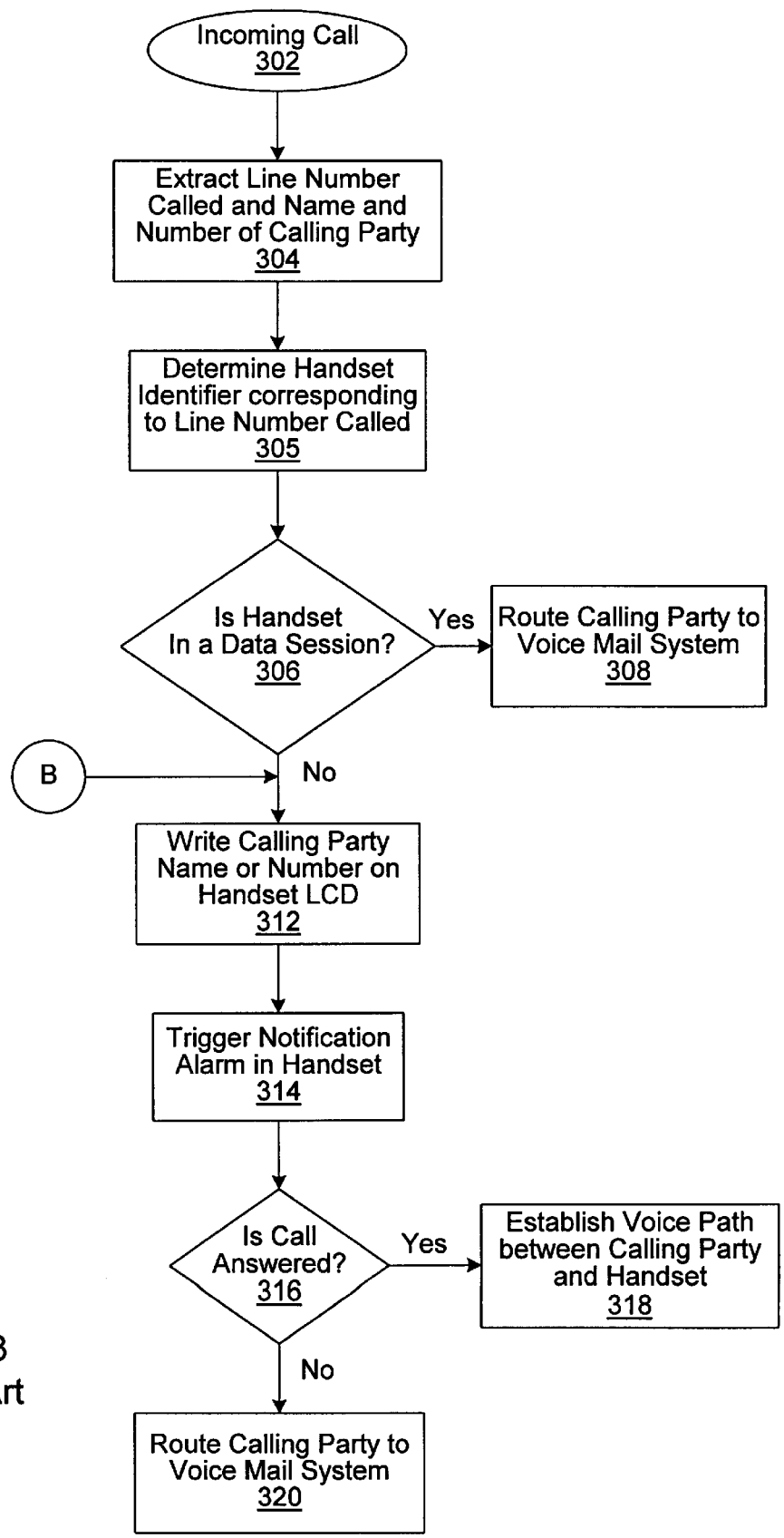
FIG. 3 is a flowchart illustrating the steps executed by typical prior art software following receipt of an incoming call.

FIG. 3 is a flowchart illustrating the steps executed by typical prior art software following receipt of an incoming call. As depicted in steps 302 and 304, following an incoming call to the central controller 204, the line number called along with the name and number of the calling party are extracted. The name of the calling party is only extracted if the central switching controller 204 and the PBX supports it. The controller 204 determines at step 305 the handset identifier that corresponds to the line number called.

A handset that is in a data session with an application 222 at step 306 appears busy at the central controller 204. In this circumstance, the calling party is routed at step 308 to the called handset identifier's corresponding voice mail box in order that the calling party can record a message for the user of the called handset 100. The data session that the called handset 100 is engaged in is not disturbed and the user of the called handset 100 is not notified of the calling party's desire to communicate with the user.

A called handset 100 that is not in a data session with an application 222 proceeds through a well known procedure controlled by the central switching controller. As depicted at step 312, the name or number of the calling party is written to the LCD 102 of the called handset 100. The notification alarm of the called handset 100 is triggered at step 314. If the called handset 100 user answers the notification alarm at step 316, the central controller 204 establishes a voice path between the calling party and the called handset 100 at step 318. In the circumstance that the called handset 100 user does not respond to the notification alarm at step 316, the calling party is routed at step 320 to the voice mail box as described above at step 308.

Figure 4:
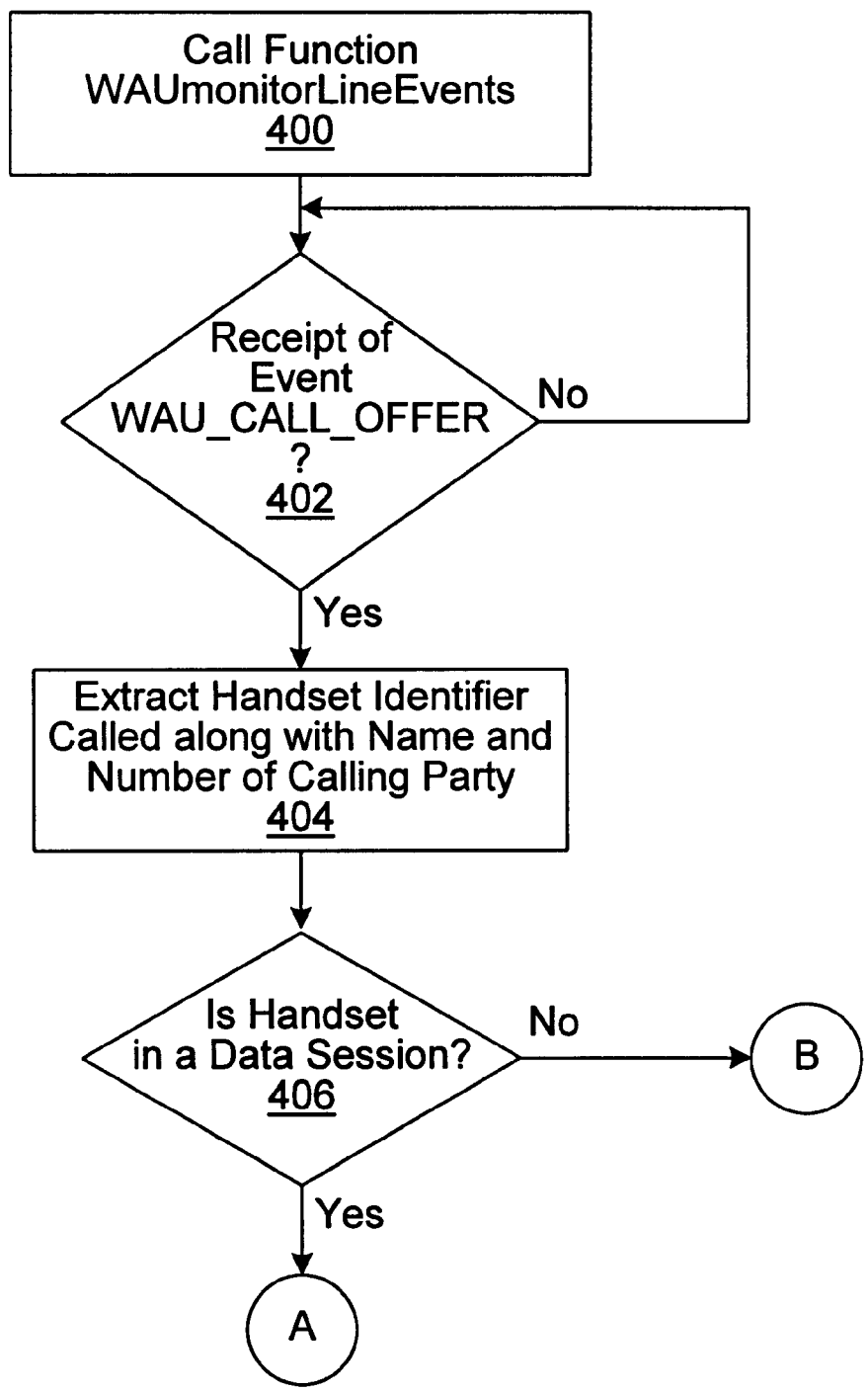
FIG. 4 is a flowchart illustrating the steps in the preferred embodiment executed following receipt of an incoming call and prior to the activation of the software contemplated by the present invention.

The sequence of steps, with reference to FIG. 4, in the preferred embodiment executed by the CAT server 218 following receipt of an incoming call and prior to the activation of the software contemplated by the present invention is now described. WAU in all functions, events, and event parameters mentioned below represents Wireless Application Unit. As depicted in step 400, CAT function WAUmonitorLineEvents is activated and tracks all phone line related activity on the in building telephone system 200. A WAU_CALL_OFFER event is received for every incoming call to every portable handset 100 in the system 200 at step 402. At the time of receipt of event WAU_CALL_OFFER the CAT server software 218 extracts from the WAU_CALL_OFFER event at step 404 the called handset identifier along with the name and number of the calling party. The called handset identifier is determined by the controller 204 after it extracts the called line number and is included as a parameter of the WAU_CALL_OFFER event. The calling party name is only extracted if this feature is supported by the central switching controller 204 and the external telephone system 210.

The central switching controller 204 tracks the portable handsets 100 and determines which cell the portable handset 100 corresponding to the called handset identifier is located within. As depicted at step 406, the CAT server software 218 determines if the called handset 100 is in a data session with an application 222 by checking for an activated data session flag for the called handset 100 within a look up table located within the CAT server software 218 containing all of the portable handset identifiers in the telephone system 200. This data session flag is triggered either by function WAUsessionStart when an application 222 initiates a data session with a portable handset 100 or by event WAUsessionRequest when the user of a portable handset 100 requests a data session with an application 222.

In the circumstance that the called handset 100 is not in a data session with an application 222, the sequence of events is identical to that described above for the prior art software at step 312 through to step 320.

Figure 5:
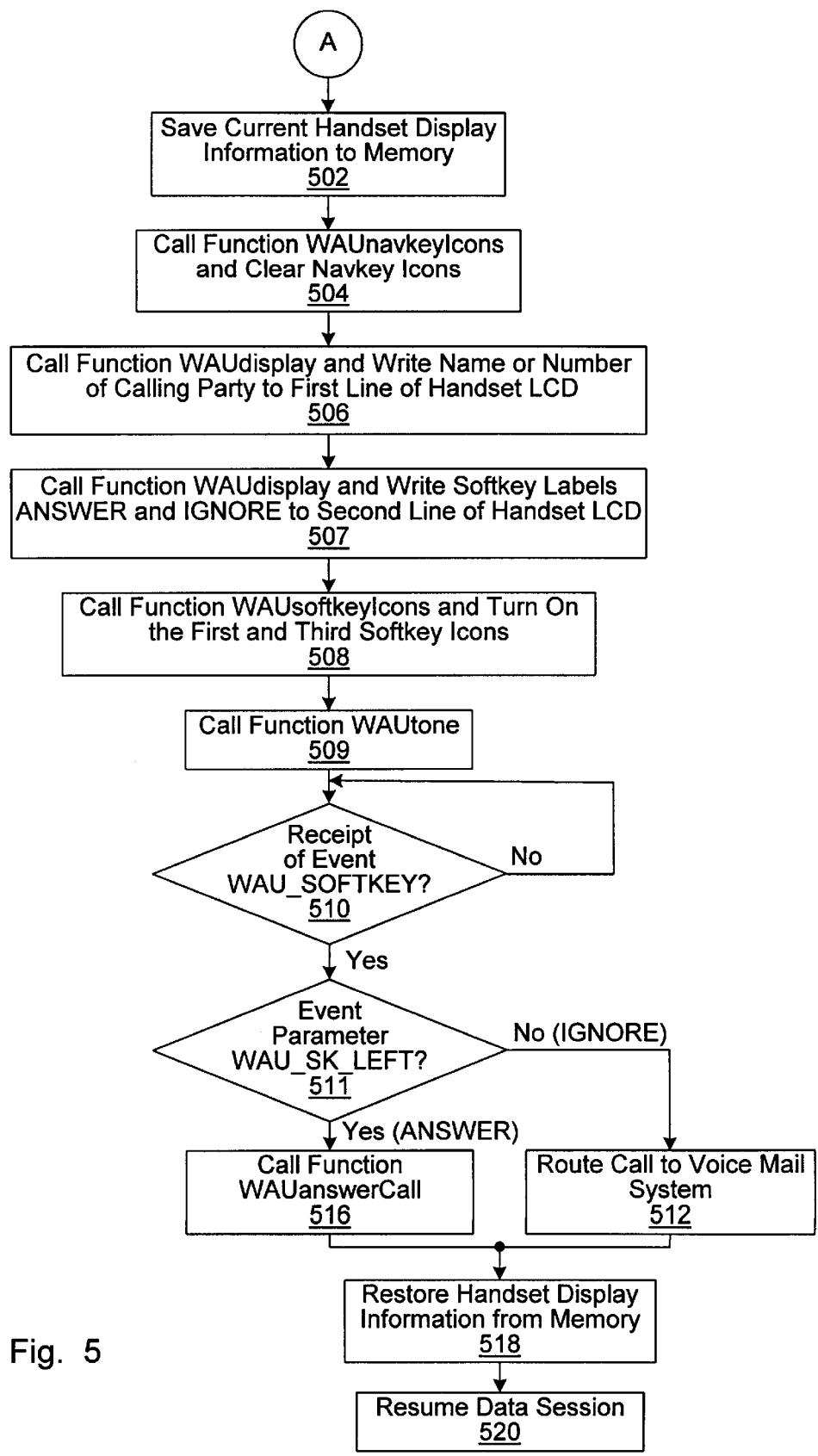
FIG. 5 is a flowchart illustrating the steps executed by the software contemplated by the present invention following receipt of an incoming call while the portable handset is in a data session with the central controller.

The sequence of steps executed on the CAT server software 218 by the WAUofferCalls function, the software contemplated by the present invention, following receipt of an incoming call while the called handset 100 is in a data session with the central controller 204 at step 406 is now described with reference to FIG. 5. This software can be added to the existing CAT server software 218 with use of an upgrade diskette or through the down loading of the software contemplated by the present invention from an Internet webpage.

As depicted in step 502, the portable handset information corresponding to the called handset 100 is stored in the CAT server buffer 224. This portable handset information includes the string displayed on the first display line 104 of the LCD 102, the string displayed on the second display line 106 of the LCD 102, the status of the softkey icons 108, 110,112 and the status of the navkey icons 114. The status of the softkey icons 108,110,112 and the navkey icons 114 are references to which icons 108,110,112,114 are on and corresponding buttons 116,118,120,122 are activated. Only icons 108,110,112,114 that are on are displayed on the LCD 102 of the portable handset 100. The navkey icons 114 on the LCD 102 of the called handset 100 are cleared by calling function WAUnavkeyIcons at step 504.

At step 506, function WAUdisplay is called and the name or number of the calling party is written to the first display line 104 of the LCD 102 if the controller 204 and the external telephone system 210 supports the extraction of such information. If the controller 204 or the external telephone system 210 does not support the extraction of the name or number of the calling party, a generic string "CALL FOR YOU" is written to the first display line 104 of the LCD 102 in place of the name or number of the calling party. Function WAUdisplay is called again at step 507 and the softkey labels are written to the second display line 106 of the LCD 102 directly above the corresponding softkey icons 108,110,112 and softkey buttons 116,118,120. The first softkey button (left) 116 corresponding to the first softkey icon (left) 108 is labelled "ANSWER" and the third softkey button (right) 120 corresponding to the third softkey icon (right) 112 is labelled "IGNORE". The function WAUsoftkeyIcons is called at step 508 to turn on the first softkey icon (left) 108 and the third softkey button (right) 112 which in turn activates the first softkey button (left) 116 and the third softkey button (right) 120. The user is then alerted at step 509 through the sending of an ATTENTION tone to the called handset 100 by calling function WAUtone.

As depicted at step 510, upon receipt of the WAU_SOFTKEY event which indicates the pressing of one of the softkey buttons 116,118,120 by the user, the event parameter WAU_SK_LEFT is monitored for at step 511. The event parameter WAU_SK_LEFT indicates the pressing of the first softkey button (left) 116 at step 510 referring to the first softkey icon (left) 108 which is labelled "ANSWER". This results at step 512 in the execution of function WAUanswerCall which establishes a voice communication path through the central switching controller 204 between the calling party and the called handset 100.

If the event parameter WAU_SK_LEFT is not received at step 511, the pressing of the third softkey button (right) 120 at step 510 referring to the third softkey icon (right) 112 labelled "IGNORE" is indicated. In this situation, the calling party is routed at step 516 to the called handset identifier's corresponding voice mail box in order that the calling party can record a message for the user of the called handset 100.

In either case described at steps 512 or 516, immediately after the receipt of event WAU_SOFTKEY the portable handset information corresponding to the called handset 100 is restored to the called handset 100 from the CAT server buffer 224. Function WAUdisplay is called and the strings stored in the CAT server buffer 224 for the first display line 104 of the LCD 102 and the second display line 106 of the LCD 102 are restored to the called handset LCD 102. The stored status of the softkey icons 108,110,112 and navigation key icons 114 are restored with the execution of functions WAUsoftkeyIcons and WAUnavkeyIcons respectively. This allows the user of the called handset 100 to resume at step 520 the data session with the application 222 at the same position that the data session was in prior to the incoming call. In the circumstance that the user pressed the first softkey button (left) 116 referring to the first softkey icon (left) 108 labelled "ANSWER", the data session continues between the called handset 100 and the application 222 concurrently with the voice communication between the called handset 100 and the calling party.

One key advantage of the implementation outlined above for the preferred embodiment of the software contemplated by the present invention is that handling of incoming calls is transparent to a software programmer using the CAT API to design additional applications 222 for the in building telephone system 200. This is a result of the preferred embodiment of the software contemplated by the present invention being implemented in the CAT server software 218. The CAT API programmer is not required to consider the case where an incoming call occurs while the called handset 100 is in a data session with their designed application 222 since the software contemplated by the present invention, when integrated in the CAT server software, will control the telephone system 200 in this case.

An additional embodiment of the present invention has the software contemplated by the present invention implemented within an application 222 regulated by the CAT server software 218. This embodiment allows the CAT API programmer to selectively run the software contemplated by the present invention during the occurrence of an incoming call while the called handset 100 is in a data session with the particular application 222.

The embodiments of the invention herein above disclosed rely on block diagrams to describe certain apparatus and their respective functions. Similarly, software functions are depicted by flowcharts of predetermined functional steps that are followed to achieve desired performance from the equipment described. These diagrams represent certain hardware and software features that would be known to those skilled in the art to whom this specification is addressed, although not in the novel combinations disclosed. Accordingly, the foregoing constitutes a sufficient description to such individuals for a comprehensive understanding of the best mode to give effect to the embodiments as disclosed and claimed herein. Although program listings have not been included to disclose the precise manner of digital computer programming to perform the operations desired, the detailed functional description presented herein, together with related flowcharts would permit a skilled programmer to program the software contemplated by the present invention to perform all operations described.

Persons skilled in the art will appreciate that there are alternative implementations and modifications possible to allow incoming voice calls to be offered to telephone handsets while in a data session with an application, and that the above method is only an illustration of this embodiment of the invention. For example, one skilled in the art could design an alternative implementation in a fixed line telephone system within the scope of the invention. This would require an altered hardware system accompanying a similar software as contemplated in the present invention. The scope of the invention, therefore, is only to be limited by the claims appended hereto.

What is claimed is:

1. A telephone communications network capable of operation in both data communication and voice communication mode, the network comprising:
   at least one display based telephone handset;
   central switching controller coupled to the telephone handset and connectable to an external switched telephone network for selective switching of the telephone handset to the external switched network; and
   a central computing device connected to the central switching controller and controlling operation of the central switching controller by means of control software running on the central computing device and providing selective access by the telephone handset through the central switching controller to application software running on the central computing device;
   wherein the control software operates, while the telephone handset is in a data communication mode with the application software and an incoming voice call for the telephone handset is received at the central switching controller, to save in memory information correspond o the telephone handset, to offer the incoming voice call to a display on the telephone handset, to connect the voice call to the telephone handset in the event that an acceptance signal is sent from the telephone handset, to reject the voice call in the event that a rejection signal is sent from the telephone handset, and to restore the information corresponding to the telephone handset to the telephone handset after reception of one of the acceptance and rejection signals.

2. A telephone communications network according to claim 1, wherein the telephone communications network comprises a plurality of the display based telephone handsets, the control software within the central computing device being capable of controlling operation of each of the telephone handsets.

3. A telephone communications network according to claim 1, wherein the control software further operates to forward the voice call to a voice mail box in the event of the rejection signal being sent from the telephone handset.

4. A telephone communications network according to claim 1, wherein prior to the offer of the incoming voice call to the display on the telephone handset, the control software further operates to write information corresponding to the calling party to the display of the telephone handset.

5. A telephone communications network according to claim 1, wherein the acceptance signal or the rejection signal is sent from the telephone handset by the pressing of a softkey button on the telephone handset.

6. A telephone communications network according to claim 1, wherein the offering of the incoming voice call to a display on the telephone handset comprises writing an acceptance string and a rejection string to the display of the telephone handset in order to label corresponding softkey buttons on the telephone handset.

7. A telephone communications network according to claim 1, wherein the control software further operates to send a notification signal to the telephone handset in the event of an incoming voice call.

8. A telephone communications network according to claim 1, wherein the central switching controller is coupled to the telephone handset through a base station, the central switching controller is connected to the base station through fixed wire, and the telephone handset is in communication with the base station through a radio channel.

9. A telephone communications network according to claim 1, wherein the central switching controller is coupled to the telephone handset through fixed wire.

10. A telephone communications network according to claim 6, wherein the offering of the incoming voice call to a display on the telephone handset further comprises activating the softkey buttons corresponding to the acceptance and rejection strings.

11. A telephone communications network according to claim 1, wherein the control software is included within a software server running on the central computing device.

12. A telephone communications network according to claim 1, wherein the control software is included within the application software running on the central computing device.

13. A telephone communications network according to claim 1, wherein the telephone handset comprises at least one of a liquid crystal display (LCD), a plurality of softkey buttons, and a plurality of navigation buttons.

14. A telephone communications network according to claim 13, wherein the information corresponding to the telephone handset comprises information associated with at least one of the LCD, the plurality of softkey buttons, and the plurality of navigation buttons.

15. A method of offering an incoming voice call to a particular display based telephone handset in a telephone communications network while the particular handset is in a data communication mode with an application software, the method comprising:
   A) on receipt of the incoming voice call, saving in memory information corresponding to the particular handset;
   B) offering the incoming voice call to a display on the particular handset;
   C) connecting the voice call to the particular handset in the event that an acceptance signal is sent from the particular handset;
   D) rejecting the voice call in the event that a rejection signal is sent from the particular handset; and
   E) restoring the information corresponding to the particular handset to the particular handset after reception of one of the acceptance and rejection signals.

16. The method of claim 15, further comprising forwarding the voice call to a voice mail box in the event of the rejection signal being sent from the telephone handset.

17. The method of claim 15, further comprising writing of information corresponding to the calling party to the display of the telephone handset prior to offering the incoming voice call to the display.

18. The method of claim 15, wherein the acceptance signal or the rejection signal is sent from the telephone handset by the pressing of a softkey button on the telephone handset.

19. The method of claim 15, wherein the offering the incoming voice call to a display on the particular telephone handset comprises writing an acceptance string and a rejection string to the display of the telephone handset in order to label corresponding softkey buttons on the telephone handset.

20. The method of claim 15, further comprising sending a notification signal to the telephone handset in the event of an incoming voice call.

21. The method of claim 19, wherein the offering the incoming voice call to a display on the particular telephone handset further comprises activating the softkey buttons corresponding to the acceptance and rejection strings.

22. A computer readable storage medium containing control software that when running on a central computing device controls the operation of a central switching controller through a plurality of control steps; and wherein the plurality of control steps performed while the telephone handset is in a data communication mode with application software and an incoming voice call for the telephone handset is received at the central switching controller comprise:

A) saving in memory information corresponding to the telephone handset;

B) offering the incoming voice call to a display on the telephone handset;

C) connecting the voice call to the telephone handset in the event that an acceptance signal is sent from the telephone handset;

D) rejecting the voice call in the event that a rejection signal is sent from the telephone handset; and E) restoring the information corresponding to the telephone handset to the telephone handset after receipt of one of the acceptance and rejection signals.

23. A computer readable storage medium according to claim 22, wherein the plurality of control steps further comprise forwarding the voice call to a voice mail box in the event of the rejection signal being sent from the telephone handset.

24. A computer readable storage medium according to claim 22, wherein the plurality of control steps further comprise writing of information corresponding to the calling party to the display of the telephone handset prior to offering the incoming voice call to the display.

25. A computer readable storage medium according to claim 22, wherein the offering the incoming voice call to a display on the telephone handset comprises writing an acceptance string and a rejection string to the display of the telephone handset in order to label corresponding softkey buttons on the telephone handset.

26. A computer readable storage medium according to claim 22, wherein the plurality of control steps further comprises sending a notification signal to the telephone handset in the event of an incoming voice call.

27. A computer readable storage medium according to claim 25, wherein the offering the incoming voice call to a display on the telephone handset further comprises activating the softkey buttons corresponding to the acceptance and rejection strings.

28. A computing device arranged to the coupled within a communications network, the computing device, with the use of control software, providing selective access by a telephone handset to an application software; and wherein, while the telephone handset is in a data communication mode with the application software and an incoming voice call for the telephone handset is received, the control software operates:

to save in memory information corresponding to the telephone handset;

to offer the incoming voice call to the telephone handset;

to connect the voice call to the telephone handset in the event that an acceptance signal is sent from the telephone handset;

to reject the voice call to the telephone handset in the event that a rejection signal is sent from the telephone handset; and to restore the information corresponding to the telephone handset to the telephone handset after reception of one of the acceptance and rejection signals.

29. A computing device according to claim 28, wherein the control software further operates to forward the incoming voice call to a voice mail box in the event of the rejection signal being sent from the telephone handset.

30. A computing device according to claim 28, wherein prior to the offer of the incoming voice call to the telephone handset, the control software further operates to write information corresponding to the calling party to a display of the telephone handset.

31. A computing device according to claim 28, wherein the offer of the incoming voice call to the telephone handset comprises writing an acceptance string and a rejection string to a display of the telephone handset in order to label corresponding softkey buttons on the telephone handset.

32. A computing device according to claim 28, wherein the offering of the incoming voice call to the telephone handset further comprises activating the softkey buttons corresponding to the acceptance and rejection strings.

33. A computing device according to claim 28, wherein the information corresponding to the telephone handset comprises information associated with at least one of a Liquid Crystal Display (LCD) on the telephone handset, a plurality of softkey buttons on the telephone handset, and a plurality of navigation buttons on the telephone handset.

34. A computing device according to claim 28, wherein the control software further operates to control operation of a central switching controller within the communications network on which the application software is running.

* * * * *